United States Patent [19]
Harada

[11] Patent Number: 5,897,615
[45] Date of Patent: Apr. 27, 1999

[54] SPEECH PACKET TRANSMISSION SYSTEM

[75] Inventor: Ryoichi Harada, Tokyo, Japan

[73] Assignee: NEC Corporation, Tokyo, Japan

[21] Appl. No.: 08/733,675

[22] Filed: Oct. 17, 1996

[30] Foreign Application Priority Data

Oct. 18, 1995 [JP] Japan .................................. 7-268910

[51] Int. Cl.⁶ .................. G10L 5/02; G10L 9/14
[52] U.S. Cl. .................... 704/214; 704/219; 704/222; 704/208
[58] Field of Search .................. 704/219, 207, 704/208, 201, 270

[56] References Cited

U.S. PATENT DOCUMENTS

| | | | |
|---|---|---|---|
| 4,044,204 | 8/1977 | Wolnowsky et al. | 704/208 |
| 4,771,465 | 9/1988 | Bronson et al. | 704/208 |
| 4,797,926 | 1/1989 | Bronson et al. | 381/36 |
| 5,113,448 | 5/1992 | Nomura et al. | 381/47 |
| 5,130,985 | 7/1992 | Kondo et al. | 370/94.1 |
| 5,148,486 | 9/1992 | Kudoh | 704/208 |
| 5,151,941 | 9/1992 | Nishiguchi et al. | 381/46 |
| 5,208,861 | 5/1993 | Fujii | 704/208 |
| 5,233,660 | 8/1993 | Chen | 381/38 |
| 5,241,535 | 8/1993 | Yoshikawa | 370/60 |
| 5,353,373 | 10/1994 | Drogo de Iacovo et al. | 395/2.32 |
| 5,406,560 | 4/1995 | Kondo et al. | 370/94.1 |

FOREIGN PATENT DOCUMENTS

| | | |
|---|---|---|
| 61-214828 | 9/1986 | Japan . |
| 1-303940 | 12/1989 | Japan . |
| 2-181552 | 7/1990 | Japan . |
| 2-220523 | 9/1990 | Japan . |
| 2-254837 | 10/1990 | Japan . |

*Primary Examiner*—David R. Hudspeth
*Assistant Examiner*—M. David Sofocleous
*Attorney, Agent, or Firm*—Scully, Scott Murphy and Presser

[57] ABSTRACT

A speech packet transmission system of the present invention has a speech coding device and a speech decoding device. In the coding device a speech coder (21) codes a PCM (Pulse Code Modulation) speech and outputs the resulting speech coded data and prediction coefficients. A speech detector (22) determines whether the input PCM speech is voiced or unvoiced. A transmission prediction coefficient memory (23) memorizes the prediction coefficients. A delay circuit (24) delays the speech coded data by a preselected delay time. On the transition from an unvoiced state to a voiced state, a transmitter (25) sends the prediction coefficients as a leading packet and then sends the delayed speech coded data as the following packet. In the decoding device, a receiver (31) received the packets from the coding device separates the packets into the prediction coefficients and the coded data. A speech decoder (32) decodes, based on the prediction coefficients separated from the leading packet, the speech decoded data separated from the following packets and thereby reproduces the PCM signal.

10 Claims, 8 Drawing Sheets

SPEECH PACKET TRANSMISSION SYSTEM

BACKGROUND OF THE INVENTION

The present invention relates to a speech packet transmission system and, more particularly, to a high efficiency speech packet transmission system for allowing a speech coder/decoder, which is applicable to a telephone line switching network using high-speed digital dedicated lines, to code speech signals with a high efficiency speech coding system and send only the voiced portions of the signals in the form of packets.

To send only the voiced portions of speech coded data in the form of packets, it is a common practice to code a linear speech signal by PCM (Pulse Code Modulation) using A-Law or $\mu$-Law. The PCM coding scheme protects the speeches of voiced portions from deterioration despite that the coded data of unvoiced portions are not sent. This is because the A-Law/$\mu$-Law coded data and the PCM linear signal correspond one-to-one to each other, i.e., one sample of the PCM linear signal can be decoded without being effected by past coded data.

By contrast, a high efficiency speech coding system, e.g., 16 kbps LD-CELP (Low-Delay Code Excited Linear Prediction) system prescribed by ITU-T Recommendation G. 728 codes and decodes speeches by backward linear prediction or similar scheme using past input signals. The precondition with the high efficiency speech coding system is that a decoder decodes incoming continuous coded data while maintaining exactly the same conditions as a coder thereinside. Also, the coder codes speeches while predicting decoded signals by analyzing past input signals.

Assume that the above high efficiency speech coding system is applied to the speech packet transmission system which sends only the voiced portions as coded data. Then, the inside conditions, particularly prediction coefficients, of the coder and those of the decoder do not coincide with each other in unvoiced portions in which no coded data are sent. As a result, speech quality is lowered at the leading end of each voiced period. To solve this problem, the coder and decoder may both be initialized, or reset, during unvoiced periods so as to have their inside conditions forcibly brought into coincidence, as taught in Japanese Patent Laid-Open Publication No. 2-181552 (Prior Art 1). Alternatively, a delay circuit may be inserted in the input side of the coder in order to handle even a part preceding each voiced portion as the voiced portion (Prior Art 2). With the delay circuit scheme, it is possible to drive both the coder and the decoder at the unvoiced portion preceding each voiced portion. Consequently, the inside conditions of the coder and those of the decoder are caused to coincide before the beginning of the actual voiced portion, preventing speech quality from being deteriorated at the leading edge of a speech.

Prior Art 1 cannot fully obviate the deterioration of speech quality at the leading end of a speech, as follows. By the initialization, both the coder and the decoder are reset to their inside conditions which will occur under the continuous receipt of a full unvoiced signal. In unvoiced compression processing, on the transition from an unvoiced portion to a voiced portion, a speech signal with power great enough for a speech detector to detect a voiced portion is input to the coder at the leading portion of the voiced portion. When a speech signal representative of the discontinuous voiced portion and different from the unvoiced signal condition is input to the coder or the decoder forcibly reset, the coder or the decoder deals with the input signal with linear prediction coefficients assigned to the full unvoiced condition. This lowers speech quality at the leading end of a speech, and moreover causes the linear prediction to fail due to the discontinuity of the internal conditions and input signal and results in unexpected sound.

In the LD-CELP system prescribed by ITU-T Recommendation G. 728, a linear predictor is driven once for 2.5 ms by using a past 13.125 ms signal stored in a buffer and representative of 105 samples. As a result, prediction coefficients are updated at the above period. Further, when the linear prediction computation becomes faulty, the linear predictor ends the processing halfway with the result that the prediction coefficients are not updated at all.

Therefore, Prior Art 2 is not practicable without resorting to the following process. First, all the 105 samples stored in the buffer for linear prediction are updated in order to render all the signals in the buffer continuous, so that the linear predictor can perform its normal processing. Subsequently, while the linear predictor repeats the normal processing a plurality of times, the linear prediction coefficients of the coder and those of the decoder are caused to gradually converge to each other. A period of time as long as 20 ms to 60 ms is necessary for the prediction coefficients to converge to a degree sufficient to obviate the deterioration of speech quality at the leading end of a speech and the unexpected sound. Such a great delay undesirably increases the delay of the entire speech packet transmission section. Moreover, the part of the unvoiced period preceding the actual voiced period is also dealt with as the voiced period and sent together with the actual voiced period. Consequently, the part of the unvoiced portion preceding the voiced portion, i.e., the inserted delay lowers an unvoiced compression effect available with the system which does not send unvoiced periods, i.e., the ratio of voiced to the total packets appeared for a given period of time.

SUMMARY OF THE INVENTION

It is therefore an object of the present invention to provide a speech packet transmission system capable of obviating the deterioration of speech quality at the leading end of a speech and unexpected sound without increasing the delay or lowering the ratio of voiced packets to the total packets.

A speech packet transmission system of the present invention has a speech coding device for coding only the voiced portions of a speech signal lying in the telephone band, and sending the resulting coded data over a transmission channel in the form of packets, and a speech decoding device for decoding the packets and outputting a reproduced speech signal representative of the voiced portions. In the speech coding device, a speech coder codes the speech signal by using a linear prediction coefficient method. A speech detector monitors the speech signal to thereby detect the voiced portion and unvoiced portion. A delay circuit delays coded data output from the speech coder to thereby output delayed coded data. A memory stores the prediction coefficients computed by the speech coder. A transmitter packetizes, based on the result of detection output from the speech detector, one of the delayed coded data and prediction coefficients stored in the memory, and outputs the resulting packet to the transmission channel. In the speech decoding device, a decision circuit determines, based on the receipt condition of packet data on the transmission channel, whether a signal on the transmission channel is the voiced period or the unvoiced period. A prediction coefficient separator separates the prediction coefficients from the packet data on the transmission channel. A coded data separator separates the coded data from the packet data. A switch delivers, based on the result of decision output from the decision circuit, the packet data on the transmission channel to one of the prediction coefficient separator and coded data separator. A speech decoder decodes, based on the prediction coefficients separated, the coded data separated by the coded data separator to thereby output the reproduced speech signal.

BRIEF DESCRIPTION OF THE DRAWINGS

The above and other objects, features and advantages of the present invention will become apparent from the following detailed description when taken with the accompanying drawings in which:

FIGS. 5A–5H are timing charts representative of a specific operation of a speech coding device shown in FIG. 1;

FIGS. 6A–6E are timing charts representative of a specific operation of a speech decoding device also shown in FIG. 1; and FIGS. 7A–7G are timing charts showing the operation of the speech decoding device which will occur when delay is not effected.

In the drawings, identical reference numerals denote identical structural elements.

DETAILED DESCRIPTION OF THE PREFERRED EMBODIMENT

Figure 1:
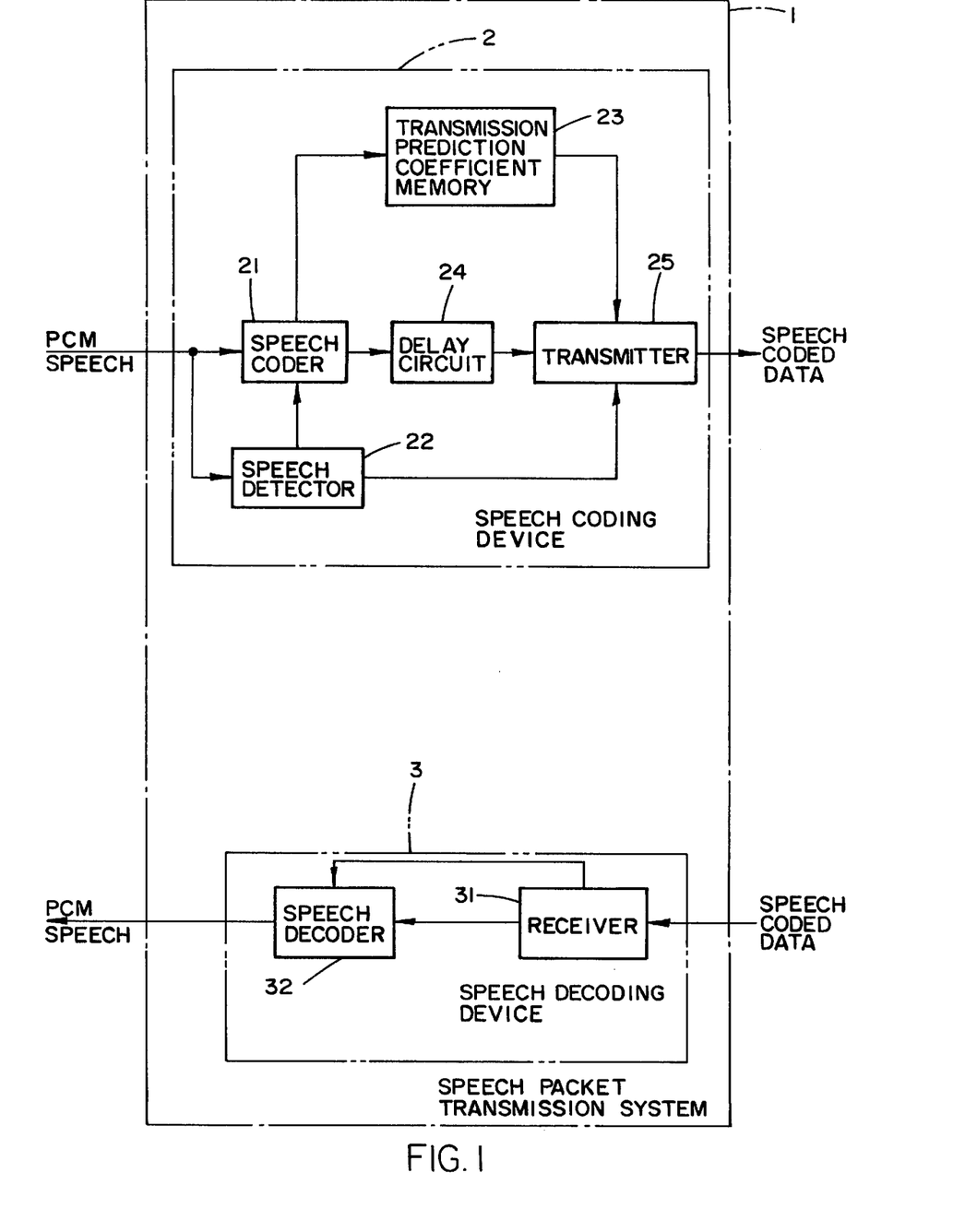
FIG. 1 is a block diagram schematically showing a speech packet transmission system embodying the present invention.

Referring to FIG. 1 of the drawings, a speech packet transmission system embodying the present invention is shown and generally designated by the reference numeral 1. As shown, the system 1 is generally made up of a speech coding device 2 and a speech decoding device 3.

The coding device 2 has a speech coder 21, a speech detector 22, a transmission prediction coefficient memory 23, a delay circuit 24, and a transmitter 25. The speech coder 21 codes an input PCM speech with high efficiency by, e.g., the LD-CELP system and feeds the resulting coded data to the delay circuit 24. At the same time, a linear predictor built in the coder 21 generates prediction coefficients. The prediction coefficients are fed from the coder 21 to the transmission prediction coefficient memory 23. The speech detector 22 determines whether the input PCM speech is voiced or unvoiced, and feeds speech decision information representative of the result of decision to the speech coder 21 and transmitter 25. The memory 23 stores the prediction coefficients output from the linear predictor of the coder 21.

The delay circuit 24 is implemented by a FIFO (First-In First-Out) buffer memory and delays the coded data output from the coder 2 by a preselected period of time. The transmitter 25 packetizes, based on the speech decision information fed from the speech detector 22, the prediction coefficient data received from the memory 23 and the coded data delayed by the delay circuit 24. The packetized data are sent over a transmission channel, not shown.

The speech decoding device 3 has a receiver 31 and a speech decoder 32. On receiving the packet from the transmitter 25, the receiver 31 disassembles, based on the receipt/non-receipt of a packet, the packets and outputs the prediction coefficients or the coded data. At this instant, the receiver 31 feeds to the decoder 32 a control signal showing whether the content of the packet is prediction coefficients or coded data. If the content of the packet is prediction coefficients as indicated by the control signal, then the decoder 32 does not decode the coded data, but it inputs the data output from the receiver 31 to a prediction coefficient memory, not shown, built therein. If the content of the packet is coded data, then the decoder 32 decodes the coded data by use of a prediction coefficients previously input to the memory and thereby outputs a PCM signal.

More specifically, the speech detector 22 monitors the level of the input PCM speech signal over a preselected interval so as to determine whether the input signal is voiced or unvoiced. The detector 22 feeds the speech decision information to the coder 21 and transmitter 25 every 25 ms packet interval. The coder 21 performs its regular high efficiency speech coding if the decision information shows that the signal is voiced. If the decision information shows that the input signal is unvoiced, the coder 21 performs a computation with a lower linear prediction accuracy, thereby coding the input signal.

In accordance with the LD-CELP system of the ITU-T Recommendation G. 728, linear prediction with thirty-two bit computation accuracy and fifty degrees is repeated every 2.5 ms by using a 13.125 ms signal, i.e., a signal of 105 samples for a rate of 64 kbit/s (kilobits per second). That is, use is made of prediction coefficients occupying:

50 (degrees)×32 (bits)=1,600 (bits)

When the input signal is unvoiced as indicated by the speech decision information, the computation accuracy is lowered from thirty-two bits to eight bits. Then, the total number of bits of the prediction coefficients is reduced to:

50 (degrees)×8 (bits)=400 (bits)

The decrease in linear prediction computation accuracy lowers decoded speech quality. However, this does not matter at all because the point of linear prediction computation during unvoiced period is not to decode the speech signal, but to cause the inside conditions of the coder 21 to coincide with those of the decoder 32 on the transition from the unvoiced state to the voiced state.

When the input signal is voiced as indicated by the speech decision signal, the coded data output from the coder 21 is input to the delay circuit 24. During unvoiced period, the coder 21 does not output the coded data, but it delivers the prediction coefficients lowered in accuracy from thirty-two bits to eight bits to the memory 23. The memory 23 stores the 400-bit prediction coefficients output from the linear predictor of the coder 21 and computed with the eight-bit accuracy within the latest 2.5 ms of the unvoiced period.

A sound source codebook, not shown, lists 1,024 excitation source vectors. The coder 21 feeds the 1,024 candidate vectors to a synthesis filter, not shown, using the linear prediction coefficients of the linear predictor. As a result, a vector providing a synthesis filter output closest to the input speech signal is selected. An index assigned to such a vector and also listed in the codebook is sent to the decoder 3 as coded data. The delay circuit 24 delays the coded data output from the coder 21 by 2.5 ms in which the prediction coefficient will be updated. The delayed coded data is applied to the transmitter 25. The coder 21 uses the prediction coefficients, which are updated every 2.5 ms, for the prediction of the next 2.5 ms signal. Therefore, the delay circuit 24 matches the relation in time between the prediction coefficients and the signal period during which speech coding or speech decoding is effected with the prediction coefficients.

The decoding device 3 receives the prediction coefficients from the coding device 2 in the first voiced packet. The device 3 can therefore decode the coded data of a packet following the first voiced packet with the received prediction coefficients.

The transmitter 25 does not perform packetizing or packet transmission if the speech decision information output from the speech detector 22 is representative of an unvoiced state. On the transition of the information from the unvoiced state to a voiced state, the transmitter 25 packetizes the 400-bit prediction coefficients stored in the memory 23 and sends them to the decoding device 3 in the form of the first packet. In accordance with the LD-CELP scheme of the ITU-T Recommendation G.72, when packets are sent with 25 ms used as a unit, each packet has 400 bits. It follows that 400 bits of prediction coefficients can be sent by a single leading packet of the voiced period. After sending the prediction coefficients in the single leading packet of the voiced period, the transmitter 25 packetizes the individual coded data delayed by the delay circuit 24 and sends it to the coding device 3.

In the decoding circuit 3, the receiver 31 identifies a voiced state if it receives a packet or identifies an unvoiced state if it does receive it. The receiver 31 delivers to the decoder 32 a control signal representative of the voiced state or the unvoiced state. On receiving packets, the receiver 31 disassembles them, feeds the leading packet to the speech decoder 32 as prediction coefficients, and feeds the packets following the leading packet to the decoder 32 as coded data.

If the control signal output from the receiver 31 is indicative of unvoiced processing, the decoder 32 does not execute speech signal decoding, but delivers the data input from the receiver 31 to the built-in prediction coefficient memory as prediction coefficients. If the control signal is indicative of voiced processing, the decoder 32 decodes the data input from the receiver 31. The decoded speech signal is output from the decoding device 3 as a PCM speech signal. Further, on receiving an index listed in the codebook as a prediction coefficient from the coding device 2, the decoder 32 reads an excitation source vector out of the sound source codebook in accordance with the index. It is to be noted that the sound source codebook included in the decoder 32 is identical with the codebook included in the coder 21. The excitation source vector is passed through a synthesis filter identical in inside condition with the synthesis filter of the coder 21, so that the coded data are decoded to turn out a speech.

Figure 2:
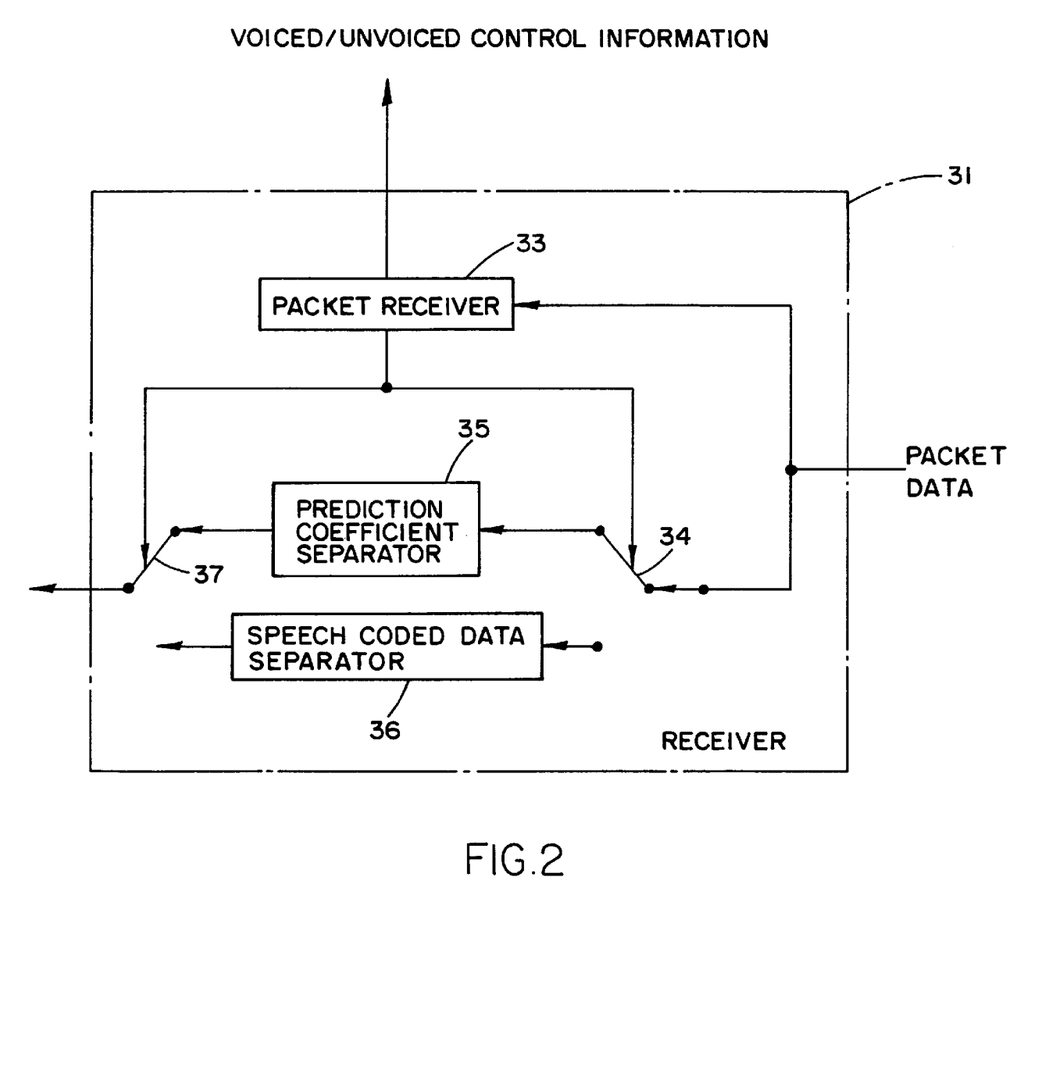
FIG. 2 is a block diagram schematically showing a receiver included in the embodiment.

FIG. 2 shows a specific configuration of the receiver 31. As shown, the receiver 31 is made up of a packet receiver 33, switches 34 and 37, a prediction coefficient separator 35, and a speech coded data separator 36. The packet receiver 33 determines the voiced/unvoiced state by monitoring the receipt/non-receipt of a packet on the basis of the input of the speech coded data. The packet receiver 33 determines, based on the result of the above decision, which of the two separators 35 and 36 should deal with the packet. Specifically, the packet receiver 33 sends voiced/unvoiced control information based on the result of decision to the decoder 32. At the same time, the packet receiver 33 controls the switches 34 and 37 in order to assign the packet processing to one of the two separators 35 and 36.

If the result of decision output from the packet receiver 33 is representative of a transition from an unvoiced state to a voiced state, the switch 34 delivers the packet data to the prediction coefficient separator 35 and causes it to process the leading one packet. The switch 37 delivers the output of the separator 35, i.e., the separated prediction coefficients to the decoder 32. If the result of decision output from the packet receiver 33 is representative of a voiced state, the switch 34 delivers the packet data to the speech coded data separator 36 and causes it to process the packet following the leading packet. At this time, the switch 37 delivers the coded data output from the separator 36 to the decoder 32.

Figure 3:
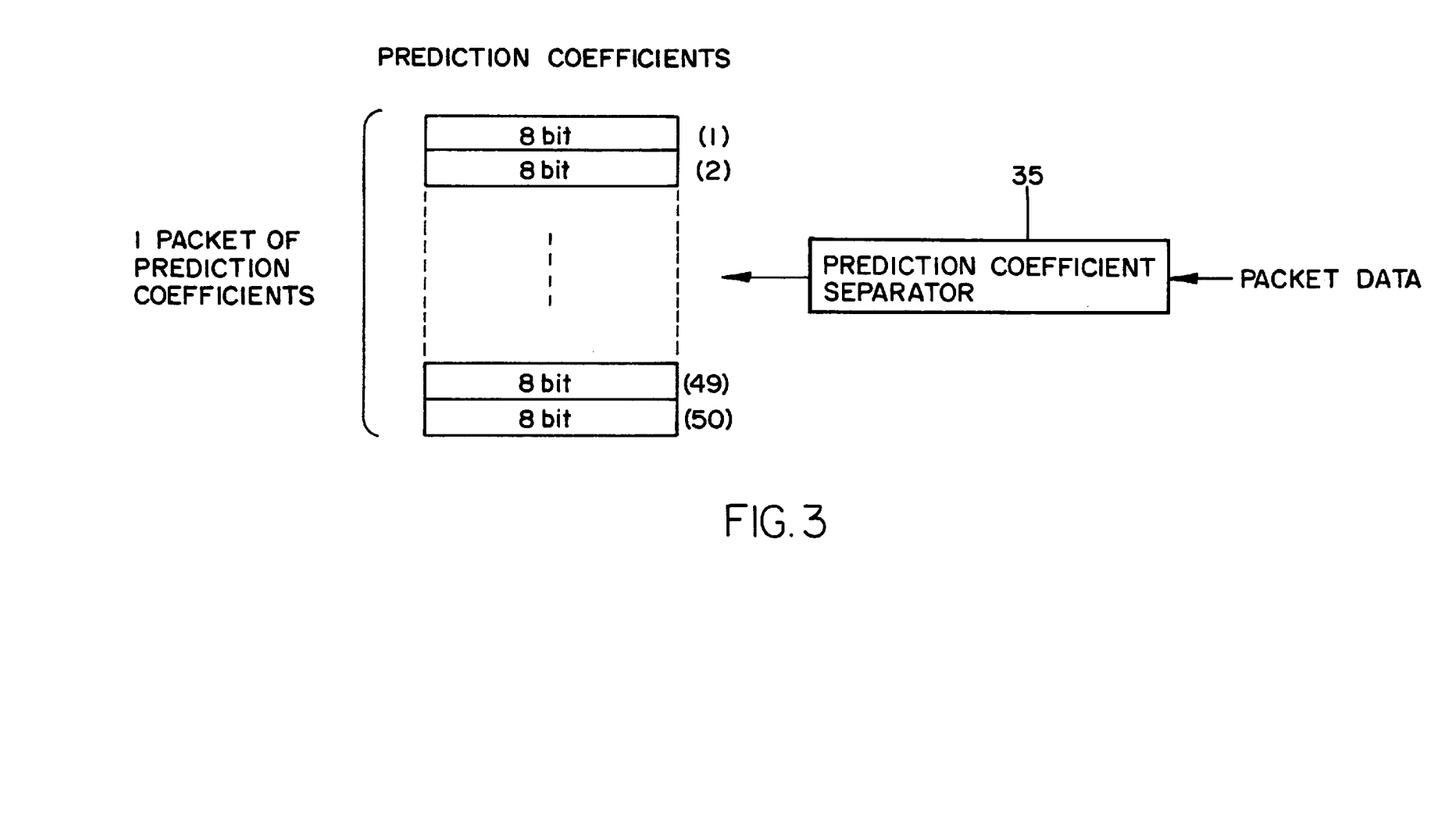
FIG. 3 demonstrates the operation of a prediction coefficient separator included in the receiver of FIG. 2.

FIG. 3 demonstrates the operation of the prediction coefficient separator 35. As shown, on receiving packet data, the separator 35 separates them to output fifty degrees of linear prediction coefficients.

Figure 4:
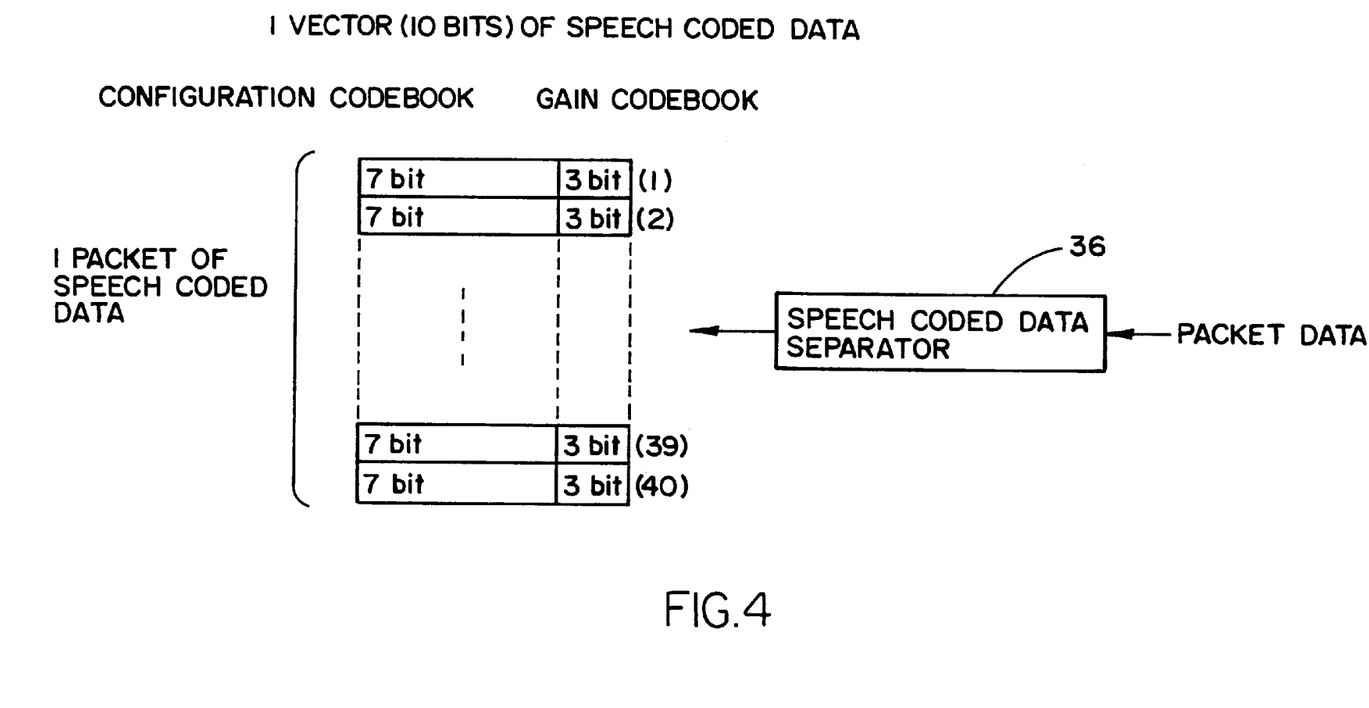
FIG. 4 demonstrates the operation of a speech coded data separator also included in the receiver of FIG. 2.

FIG. 4 demonstrates the operation of the speech coded data separator 36. As shown, on receiving packet data, the separator 36 separates seven bits of a configuration codebook and three bits of a gain codebook, the most significant bit being first, to produce one vector of data. In this manner, the separator 36 outputs forty vectors for each of the input packets and thereby produces speech CODEC coded data particular to the LD-CELP system as prescribed by the ITU-T Recommendation G. 728.

FIGS. 5A–5H show a specific operation of the coding device 2 shown in FIG. 1 while FIGS. 6A–6E show a specific operation of the decoding device 3 also shown in FIG. 1. FIGS. 7A–7G show the operation of the coding device 2 which will occur if delay is not effected. The delay processing particular to the coding device 2 will be described with reference to the above figures.

In the LD-CELP system in accordance with ITU-T Recommendation G. 728, the coder 21 computes linear prediction coefficients every 2.5 ms and updates the memory 23 with the result of computation. This means that the contents of the memory 23 are updated every 2.5 ms. The coder 21 and decoder 32 each performs coding or decoding by use of the latest linear prediction coefficients. For example, at times t1–t15 shown in FIG. 5C, linear prediction coefficients a-o are computed for input PCM speeches A-O, respectively, while being sequentially updated. At this instant, the coder 21 codes the input PCM speeches A-O by using the linear prediction coefficients a-o, respectively. The coder 21 delivers the coded data A-O to the delay circuit 24 and delivers the prediction coefficients a-o to the memory 23.

Figures 5A, 5B:
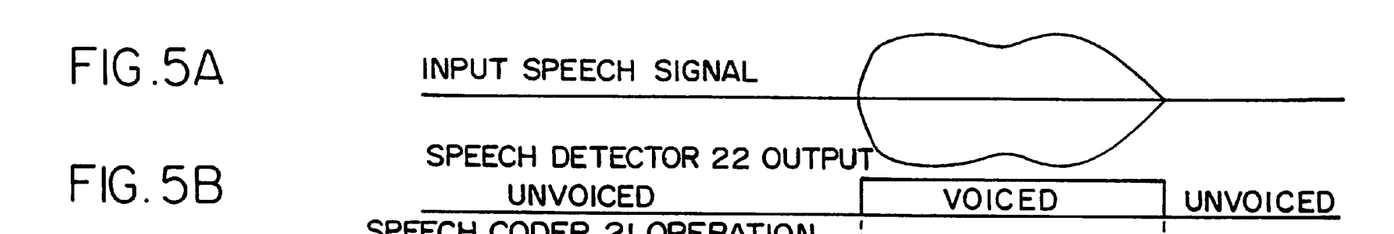
Figure 5C:
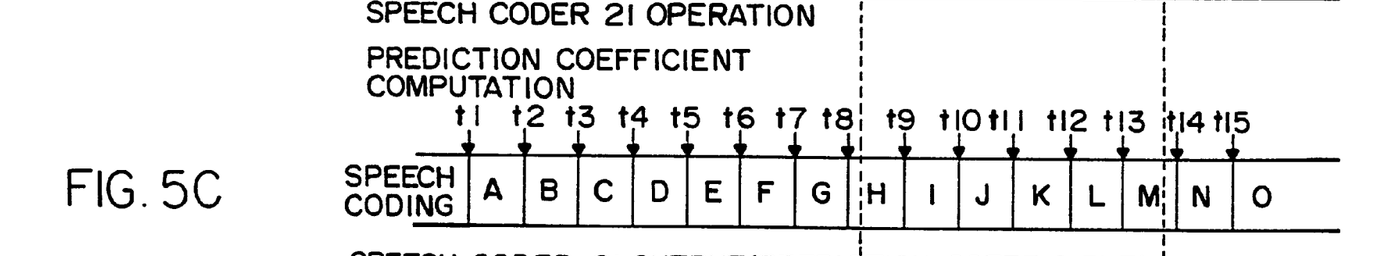
Figure 5D:
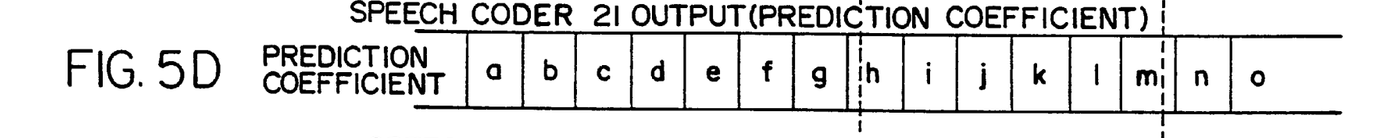
Figure 5E:
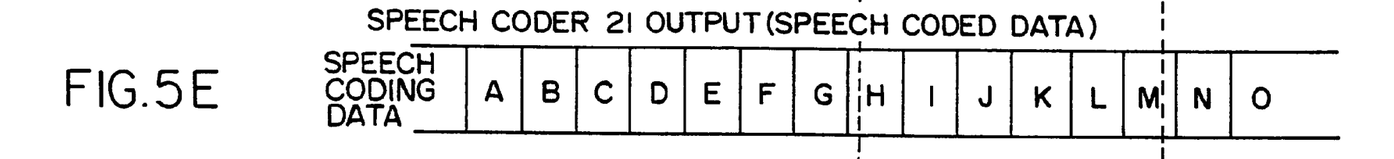
Figure 5F:
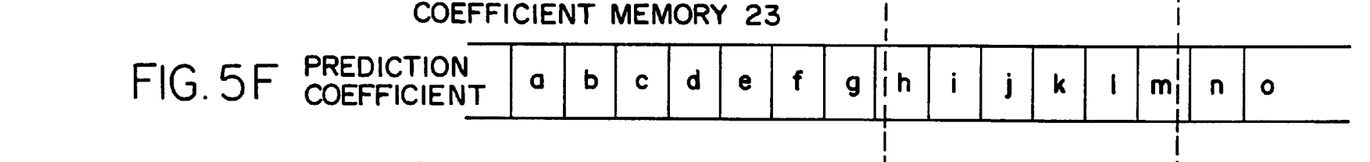
Figure 5G:
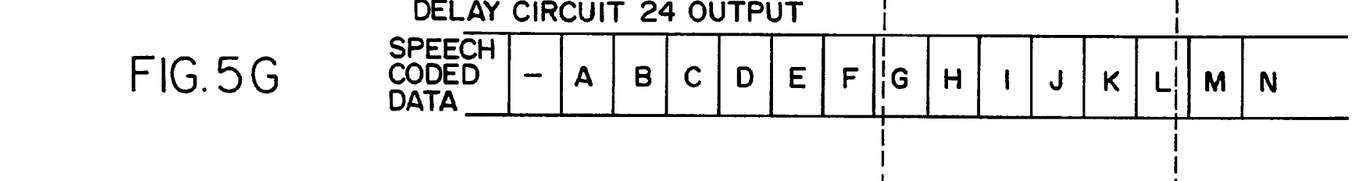
Figure 5H:
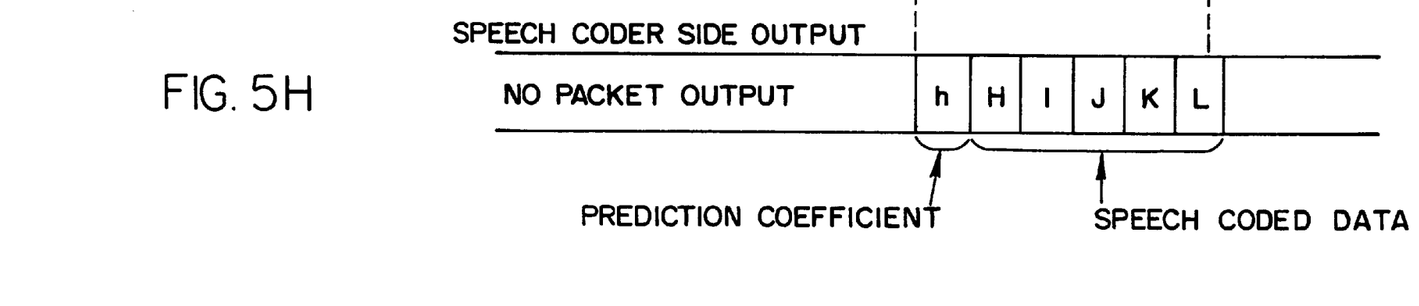
Figures 6A, 6B:
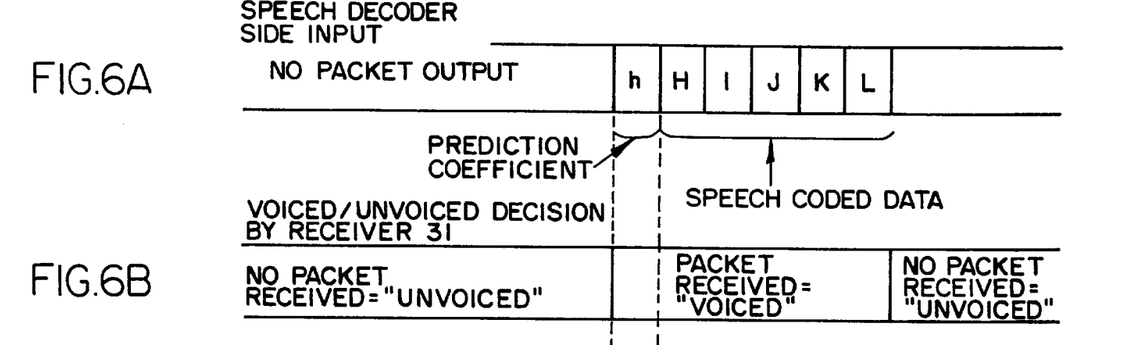
Figure 6C:
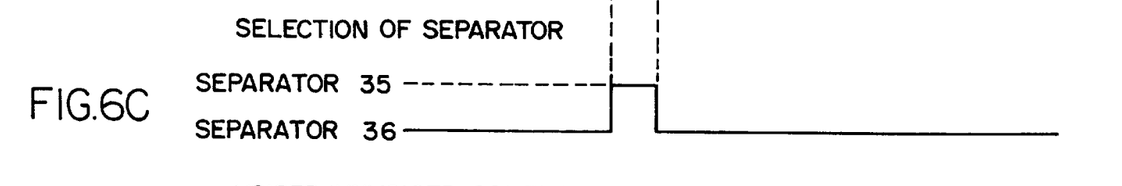
Figure 6D:
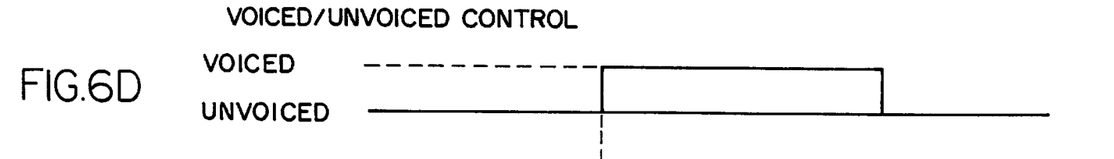
Figure 6E:
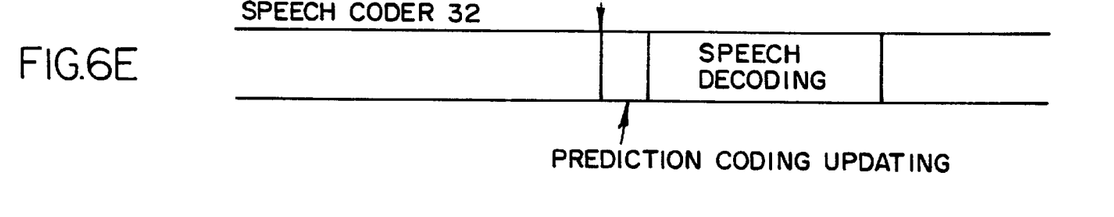
Figures 7A, 7B:
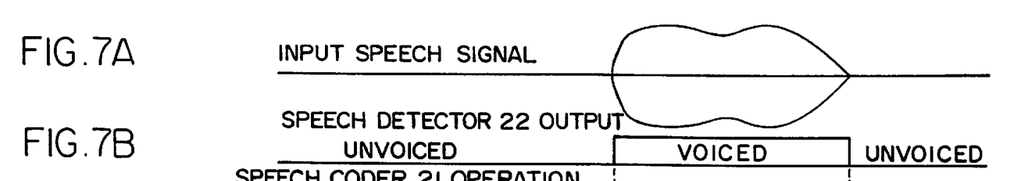
Figure 7C:
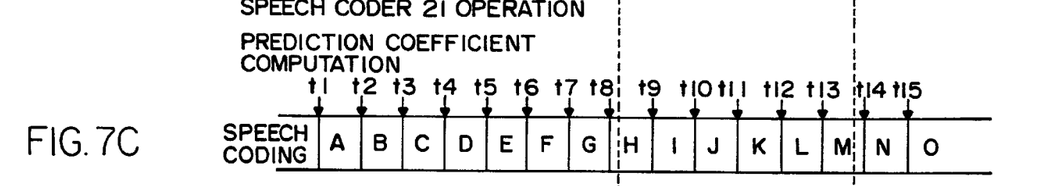
Figure 7D:
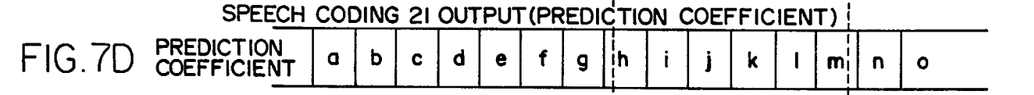
Figure 7E:
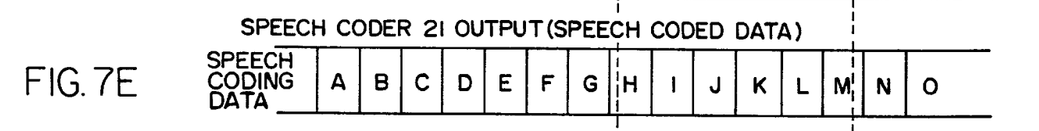
Figure 7F:
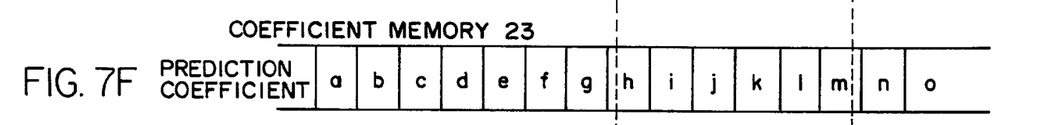
Figure 7G:
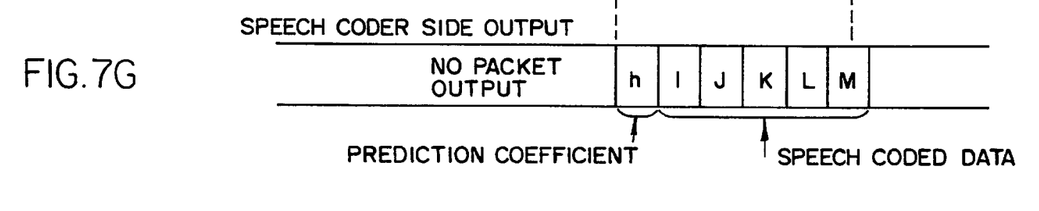

Assume that the speech detector 22 has detected a transition from an unvoiced state to a voiced state at a time t8 and has continuously detected the voiced state up to a time t13. Then, the transmitter outputs the linear prediction coefficient h as a single leading packet leading voiced packets, and then outputs the following voiced packets or speech coded data H–L.

As shown in FIGS. 6A–6E, on receiving the packets, the decoder 32 of the decoding device 3 performs linear prediction coefficient updating processing with the prediction coefficient h separated from the leading voiced packet, and then decodes the following voiced packets to output the decoded data H–L.

By contrast, assume that the coding device 2 does not delay the coded data. Then, as shown in FIGS. 7A–7G, the prediction coefficient h updated at the time t8 and read out of the memory 23 and the coded data I-M output at time 9 and onward are sent from the coding device 2 to the decoding device 3 as packet data. Originally, to bring the internal conditions of the coding device 3 into coincidence with those of the coding device 2, if the prediction coefficient h is computed at the time t8, then the coded data H output from the coder 21 should be decoded. Likewise, if the prediction coefficient i is computed at a time t9, then the coded data I output from the coder 21 should be decoded. However, because the prediction coefficient h and coded data I-M are sent from the coding device 2 to the decoding device 3, the device 3 decodes the coded data I with the inadequate prediction coefficient h.

In the illustrative embodiment, the above problem is eliminated because the delay circuit 24 of the coding device 2 delays the coded data H-L by the updating time of the memory 23, i.e., the prediction coefficient updating time.

As stated above, the coding device 2 included in the speech packet transmission system 1 codes only the voiced portions of a speech signal lying in the telephone band, and sends the coded data over a transmission channel in the form of packets. The decoding device 3 also included in the system 1 decodes the received packets and outputs a reproduced speech signal representative of the voiced portions. In the coding circuit 2, when the speech detector 22 detects a transition from an unvoiced state to a voiced state, the latest linear prediction coefficients stored in the memory 23 are sent to the decoding device via the transmitter 25 as a single leading packet leading voiced packets. Subsequently, speech coded data output from the speech coder 21 and then delayed by the delay circuit 24 are sent to the decoding device 3 via the transmitter 25 as voiced packets. In the decoding circuit 3, the speech decoder 32 decodes the speech coded data with the prediction coefficients received before the speech coded data. As a result, the inside conditions of the coder 21 and those of the decoder 32 are brought into coincidence on the basis of the prediction coefficients leading the voiced packets. This successfully prevents the leading end of a speech from being deteriorated and obviates unexpected sound without increasing delay or lowering the ratio of voiced packets to the total packets.

While the present invention has been described in connection with a certain preferred embodiment, it is to be understood that the subject matter encompassed by the present invention is not limited to the specific embodiment. On the contrary, it is intended for the subject matter of the present invention to include all alternatives, modifications and equivalents as can be included within the spirit and scope of the following claims.

What is claimed is:

1. A speech coding device comprising:
   a coder for coding a speech signal;
   a speech detector for monitoring the speech signal to thereby detect a voiced period and an unvoiced period;
   a time delay circuit for delaying coded data output from said coder to thereby output delayed coded data;
   a memory for storing prediction coefficients computed by said coder; and
   a transmitter for sending, in accordance with a result of detection output from said speech detector, a speech coded data which includes said delayed coded data and said prediction coefficients read out of said memory, wherein a leading packet of said speech coded data during said voiced period includes said prediction coefficients beginning with a prediction coefficient which corresponds to a first one of said delayed coded data.

2. A decoding device for decoding a coded speech signal comprising:
   decision means for determining whether the coded speech signal is representative of a voiced period or an unvoiced period;
   prediction coefficient separating means for separating from the coded speech signal prediction coefficients used for decoding;
   coded data separating means for separating coded data from the coded speech signal, wherein a leading packet of said coded speech signal during said voiced period includes said prediction coefficients beginning with a prediction coefficient which corresponds to a first one of said coded data; and
   a decoder for decoding, in accordance with a result of decision output from said decision means and on the basis of said prediction coefficients, the coded data to thereby output a reproduced speech signal.

3. A speech packet transmission system including a speech coding device for coding only voiced portions of a speech signal lying in a telephone band, and sending packetized coded data over a transmission channel, and a speech decoding device for decoding the packetized coded data and outputting a reproduced speech signal representative of the voiced portions,
   said speech coding device comprising:
   speech coding means for coding the speech signal by using a linear prediction coefficient method;
   speech detecting means for monitoring the speech signal to thereby detect the voiced portions and unvoiced portions of the speech signal;
   time delaying means for delaying coded data output from said speech coding means to thereby output delayed coded data;
   storing means for storing prediction coefficients computed by said speech coding means; and
   transmitting means for packetizing, based on a result of detection output from said speech detecting means, one of said delayed coded data and said prediction coefficients stored in said storing means, and outputting the packetized coded data to the transmission channel, wherein a leading packet of said packetized coded data during said voiced portions includes said prediction coefficients beginning with a prediction coefficient which corresponds to a first one of said delayed coded data;
   said speech decoding device comprising:
   decision means for determining, based on a receipt condition of the packetized coded data on the transmission channel, whether a signal on the transmission channel is during the voiced portions or the unvoiced portions;
   prediction coefficient separating means for separating the prediction coefficients from the packetized coded data on the transmission channel;
   coded data separating means for separating the delayed coded data from the packetized coded data;
   switching means for delivering, based on a result of decision output from said decision means, the packetized coded data on the transmission channel to one of said prediction coefficient separating means and said coded data separating means; and
   speech decoding means for decoding, based on said prediction coefficients separated by the prediction coefficient separating means, the delayed coded data separated by said coded data separating means to thereby output the reproduced speech signal.

4. A system as claimed in claim 3, wherein said transmitting means packetizes, on transitions from the unvoiced in to the voiced portions as detected by said speech detecting means, said prediction coefficients stored in said storing means to form packetized prediction coefficients, outputs the packetized prediction coefficients to the transmission channel, packetizes, after said packetized prediction coefficients, the delayed coded data to form packetized delayed coded data, and outputs the packetized delayed coded data to the transmission channel, and wherein said switching means delivers, on the transition from the unvoiced portions to the voiced portions, the packetized prediction coefficients on the transmission channel to said prediction coefficient separating means, and delivers the packetized delayed coded data following said packetized prediction coefficients to said coded data separating means.

5. A system as claimed in claim 3, wherein said speech coding means and said speech decoding means each uses an LD-CELP system which decodes a synthetic speech by using linear prediction coefficients out of a sound codebook listing a plurality of excitation source vectors and outputs, as the prediction coefficients, the excitation source vector providing synthetic sound closest to an input speech.

6. A system as claimed in claim 3, wherein said speech coding means operates with lower computation accuracy when said speech detecting means detects the unvoiced portions than when said speech detecting means detects the voiced portions.

7. A system as claimed in claim 3, wherein said delaying means delays the coded data output from said speech coding means by an updating time assigned to said storing means.

8. A method of speech coding comprising the steps of:
coding a speech signal to produce coded data;
monitoring the speech signal to thereby detect a voiced period and an unvoiced period;
time delaying said coded data to thereby output delayed coded data;
storing prediction coefficients computed by said coding step into a memory; and
sending, in accordance with a result of detection of said monitoring step, a speech coded data which includes said delayed coded data and said prediction coefficients read out of said memory, wherein a leading packet of said speech coded data during said voiced portions includes said prediction coefficients beginning with a prediction coefficient which corresponds to a first one of said delayed coded data.

9. A method of decoding a coded speech signal coded by a coder, comprising the steps of:
determining whether the coded speech signal is representative of a voiced period or an unvoiced period;
separating prediction coefficients used for coding from the coded speech signal;
separating coded voice data from the coded speech signal, wherein a leading packet of said coded speech signal during said voiced period includes said prediction coefficients beginning with a prediction coefficient which corresponds to a first one of said coded voice data; and
decoding, in accordance with a result of the determining step and on the basis of said prediction coefficients, the coded data to thereby output a reproduced speech signal.

10. A method of coding and decoding only voiced portions of a speech signal lying in a telephone band, and sending resulting coded data over a transmission channel in a form of packets, said coding method comprising the steps of:
coding the speech signal by using a linear prediction coefficient method to produce coded data;
monitoring the speech signal to thereby detect the voiced portions and unvoiced portions;
time delaying said coded data to thereby output delayed coded data;
storing prediction coefficients computed by the coding step into a memory; and
packetizing, based on a result of the monitoring step, one of said delayed coded data and said prediction coefficients stored in said memory, and outputting said resulting coded data to the transmission channel, wherein a leading packet of said resulting coded data during said voiced portions includes said prediction coefficients beginning with a prediction coefficient which corresponds to a first one of said delayed coded data;
said speech decoding method comprising the steps of:
determining, based on a receipt condition of said resulting coded data on the transmission channel, whether a signal on the transmission channel is the voiced portions or the unvoiced portions;
separating the prediction coefficients from the resulting coded data on the transmission channel;
separating the delayed coded data from the resulting coded data;
decoding, based on said prediction coefficients separated by the prediction coefficients separating step, the delayed coded data separated by the delayed coded data separating step to thereby output a reproduced speech signal.

* * * * *

UNITED STATES PATENT AND TRADEMARK OFFICE
CERTIFICATE OF CORRECTION

PATENT NO. : 5,897,615
DATED : April 27, 1999
INVENTOR(S) : Kyoichi Harada

It is certified that error appears in the above-identified patent and that said Letters Patent is hereby corrected as shown below:

Column 8, Line 65 and 66, Claim 4: "unvoiced in to the" should read

--unvoiced portions to the voiced--

Column 10, Line 9, Claim 9: "coded data" should read --coded voice data--

Signed and Sealed this

Tenth Day of October, 2000

Attest:

Q. TODD DICKINSON

*Attesting Officer*       *Director of Patents and Trademarks*